United States Patent
Sim

(10) Patent No.: US 10,848,022 B2
(45) Date of Patent: Nov. 24, 2020

(54) ROTOR FOR ELECTRIC MOTOR

(71) Applicant: LG Electronics Inc., Seoul (KR)

(72) Inventor: Somi Sim, Seoul (KR)

(73) Assignee: LG Electronics Inc., Seoul (KR)

( * ) Notice: Subject to any disclaimer, the term of this patent is extended or adjusted under 35 U.S.C. 154(b) by 457 days.

(21) Appl. No.: 15/722,675

(22) Filed: Oct. 2, 2017

(65) Prior Publication Data

US 2019/0006895 A1 Jan. 3, 2019

(30) Foreign Application Priority Data

Jun. 29, 2017 (KR) .......................... 10-2017-0082786

(51) Int. Cl.
| | |
|---|---|
| *H02K 1/26* | (2006.01) |
| *H02K 17/16* | (2006.01) |
| *H02K 3/12* | (2006.01) |
| *H02K 5/04* | (2006.01) |
| *H02K 9/22* | (2006.01) |
| *H02K 9/06* | (2006.01) |

(52) U.S. Cl.
CPC ............... *H02K 1/265* (2013.01); *H02K 3/12* (2013.01); *H02K 5/04* (2013.01); *H02K 17/165* (2013.01); *H02K 9/06* (2013.01); *H02K 9/22* (2013.01); *H02K 2213/03* (2013.01)

(58) Field of Classification Search
CPC .. H02K 17/165; H02K 1/265; H02K 2213/03; H02K 3/12; H02K 5/04; H02K 9/06; H02K 9/22
See application file for complete search history.

(56) References Cited

U.S. PATENT DOCUMENTS

| | | | | |
|---|---|---|---|---|
| 2005/0073216 A1* | 4/2005 | Mitcham | .............. | H02K 17/165 310/270 |
| 2011/0254400 A1* | 10/2011 | Vallejo | ................. | H02K 17/165 310/211 |
| 2011/0291516 A1* | 12/2011 | Alexander | ......... | B22D 19/0054 310/211 |
| 2018/0062486 A1* | 3/2018 | Agapiou | ............ | H02K 15/0012 |
| 2018/0278106 A1* | 9/2018 | Moriya | .................... | H02K 1/26 |

FOREIGN PATENT DOCUMENTS

| | | |
|---|---|---|
| JP | 08149736 | 6/1996 |
| KR | 10-2002-0024873 | 4/2002 |
| KR | 101042778 | 6/2011 |

* cited by examiner

*Primary Examiner* — Thienvu V Tran
*Assistant Examiner* — Bart Iliya
(74) *Attorney, Agent, or Firm* — Fish & Richardson P.C.

(57) ABSTRACT

A rotor for an electric motor includes a rotor core defining a plurality of slots that are spaced apart from each other and arranged along a circumferential direction of the rotor core, and a rotor winding provided at the plurality of slots and configured to flow current. The rotor winding includes a plurality of conductor bars that extend in an axial direction of the rotor core and that are disposed in a slot of the plurality of slots, and end rings that are disposed at both sides of the plurality of conductor bars and that connect the plurality of conductor bars to each other. The rotor further includes deformation preventing units each of which surrounds and contacts an outer surface of one of the end rings. The deformation preventing units are configured to restrict deformation of the end rings.

17 Claims, 14 Drawing Sheets

ROTOR FOR ELECTRIC MOTOR

CROSS-REFERENCE TO RELATED APPLICATION

Pursuant to 35 USC § 119 (a), this application claims the benefit of an earlier filing date and priority to Korean Application No. 10-2017-0082786, filed on Jun. 29, 2017, the contents of which are incorporated by reference herein in its entirety.

FIELD

The present disclosure relates to a rotor for an electric motor.

BACKGROUND

An electric motor is a device that can convert electric energy into mechanical energy. The electric motor may include a stator and a rotor rotatably arranged with respect to the stator. The stator may include a stator core and a stator coil wound around the stator core.

In some examples, an electric motor may include a synchronous machine in which a rotor rotates at a synchronous speed and an induction machine in which a rotor rotates with a predetermined slip. The rotor of the synchronous machine may include permanent magnets having different magnetic poles along a circumferential direction. The rotor of the synchronous machine may further include a plurality of flux barriers spaced apart from each other in the circumferential direction. The induction machine may include a rotor core and a rotor winding located on the rotor core.

The rotor winding may include, for example, a plurality of conductor bars inserted in the rotor core in an axial direction, and end rings connecting both end portions of the plurality of conductor bars such that currents flow.

In examples where the conductor bar and the end ring of the rotor of the induction machine are made of copper (Cu), fabricating cost may increase due to material cost, and other cost and effort may be required to machine the conductor bars and end rings.

In examples where the conductor bar and the end ring are made of aluminum (Al), a relatively large sectional area may be needed for sufficient electrical conductivity considering aluminum material properties, and vulnerable strength may be a problem.

For example, when an ambient temperature increases during an operation of the motor, thermal deformation of the rotor due to the high temperature may cause an interference with surrounding components. In some examples where the rotor is operated at a high speed, the rotor may be damaged by deformation due to a high temperature and an increase in centrifugal force due to the high speed. In examples where the conductor bar is disposed inward from an outer surface of the rotor core to prevent the damage to the rotor, an output density of the motor may decrease.

SUMMARY

An aspect of the present disclosure is to provide a rotor for an electric motor capable of restricting deformation and damage of the rotor.

Another aspect of the present disclosure is to provide a rotor for an electric motor capable of operating at a high speed with an improved output density.

Another aspect of the present disclosure is to provide a rotor for an electric motor capable of reducing a fabricating cost, and facilitating fabrication and assembly.

According to one aspect of the subject matter described in this application, a rotor for an electric motor includes a rotor core defining a plurality of slots that are spaced apart from each other and arranged along a circumferential direction of the rotor core, a rotor winding being provided at the plurality of slots and configured to flow current and including a plurality of conductor bars each of which extends in an axial direction of the rotor core and is disposed in a slot of the plurality of slots, and end rings disposed at both sides of the plurality of conductor bars and connecting the plurality of conductor bars to each other. The rotor further includes deformation preventing units each of which surrounds and contacts an outer surface of one of the end rings. The deformation preventing units are configured to restrict deformation of the end rings.

Implementations according to this aspect may include one or more of the following features. For example, a thermal expansion coefficient of the deformation preventing units may be less than that of the end rings to restrict radial deformation of the end rings. The deformation preventing units may have a ring shape corresponding to the end rings. The plurality of conductor bars and the end rings may be made of aluminum. In some examples, each of the end rings may include a protrusion that protrudes from an end surface in the axial direction of the rotor core, and each of the deformation preventing units may include a body portion having a ring shape and surrounding the outer surface of one of the end rings, and a protrusion coupling portion extending from the body portion in a radial direction of the rotor core and coupling to the protrusion.

In some implementations, the protrusion coupling portion may define a through hole that receives the protrusion, and the protrusion may include a head portion having a diameter greater than the through hole and configured to restrict axial movement of the deformation preventing units. In some examples, the head portion may be configured to extend outside the through hole by pressing the head portion in the axial direction based on the protrusion having been inserted in the through hole.

In some implementations, the protrusion may include a plurality of protrusions that are spaced apart from each other and arranged along the circumferential direction on the end surface of one of the end rings, and the end rings may include a protruding portion that protrudes from the end surface in the axial direction and is disposed on at least one side of each of the plurality of protrusions. In some cases, the protruding portion may include a plurality of protrusion portions each of which may be disposed between a pair of protrusions.

In some examples, each of the end rings may include a protruding portion that protrudes from an end surface in the axial direction of the rotor core, and each of the deformation preventing units may include a body portion having a ring shape and surrounding the outer surface of one of the end rings, and a coupling portion extending from the body portion in a radial direction of the rotor core and coupling to the protruding portion. The protruding portion may include a separation preventing unit that protrudes from a surface of the protruding portion and that is configured to restrict separation of the protruding portion from the coupling portion based on the protruding portion being coupled to the coupling portion. In some cases, the protruding portion couples to the coupling portion in the axial direction, and the separation preventing unit includes a separation preventing protrusion that extends in the axial direction.

In some implementations, the protruding portion may define a side surface that slopes with respect to the radial direction of the rotor core by a predetermined inclination angle. The protruding portion may include a plurality of protruding portions that are spaced apart from each other and arranged along the circumferential direction on the end surface of one of the end rings, where the coupling portion includes a plurality of coupling portions that couple to the plurality of protruding portions, respectively.

In some examples, the rotor core may define a penetrating portion that extends through the rotor core in the axial direction and that allows flow of air or liquid through the penetrating portion. The outer surface of the end rings may be disposed radially inward of an outer surface of the plurality of conductor bars, and an outer diameter of the deformation preventing units may be less than or equal to an outer diameter of the rotor core.

In some examples, the outer surface of the plurality of conductor bars may be disposed radially outward of an outer surface of the deformation preventing units. In some examples, a width of the end rings in the axial direction is greater than a width of the deformation preventing units in the axial direction. The slot may include an outer surface and an inner surface disposed radially inward of the outer surface of the slot, and a width of the outer surface of the slot may be greater than that of the inner surface of the slot.

In some implementations, each end ring includes a plurality of protrusions that protrude from an end surface in the axial direction and that are arranged in the circumferential direction of the rotor core, and a plurality of protruding portions that protrude from the end surface and that are alternately disposed between the plurality of protrusions.

As described above, a deformation preventing unit may be made of a material having a smaller thermal expansion coefficient than an end ring and be closely adhered to an outer surface of the end ring, so as to prevent deformation of the end ring, thereby preventing a rotor from being deformed outwardly and/or damaged in a radial direction.

Accordingly, conductor bars of a rotor core may be disposed outwardly along the radial direction, which may result in improving output density of an electric motor.

In addition, the rotor can be operated at a high speed in a high temperature environment.

In some examples, the conductor bar and the end ring may be made of aluminum in a die-casting manner, and the end ring may include protrusions protruding in an axial direction, while the deformation preventing unit may include protrusion coupling portions coupled with the protrusions, thereby reducing a fabricating cost and facilitating fabrication and assembly.

The protrusion may have a head portion larger than a through hole of the protrusion coupling portion, which may result in further reducing the fabricating cost. In some examples, the head portion may be made by a pressing process.

In some implementations, the conductor bar and the end ring may be fabricated by die-casting an aluminum material, the end ring may include protruding portions protruding in an axial direction, and the deformation preventing unit may include coupling portions coupled to the protruding portions, which may result in reducing the fabricating cost and facilitating fabrication and assembly.

In some examples, a separation preventing unit may be provided on each mutual contact area between the protruding portions and the coupling portions, thereby preventing an unintentional separation of the deformation preventing unit.

The protruding portions may increase a contact area with ambient fluid, thereby reducing a temperature increase of the rotor. Each of the protruding portions may include side surfaces each of which defines an inclination angle with respect to the radial direction of the rotor core to facilitate flow of the surrounding fluid during rotation of the rotor for cooling of the rotor and a stator.

DETAILED DESCRIPTION

Hereinafter, description will now be given in detail according to exemplary implementations disclosed herein, with reference to the accompanying drawings. For the sake of brief description with reference to the drawings, the same or equivalent components may include the same or similar reference numbers, and description thereof will not be repeated. A singular representation may include a plural representation unless it represents a definitely different meaning from the context. In describing the present disclosure, the detailed description will be omitted when a specific description for publicly known technologies to which the disclosure pertains is judged to obscure the gist of the present disclosure. Also, it should be noted that the accompanying drawings are merely illustrated to easily explain the spirit of the disclosure, and therefore, they should not be construed to limit the spirit of the disclosure by the accompanying drawings.

Figure 1:
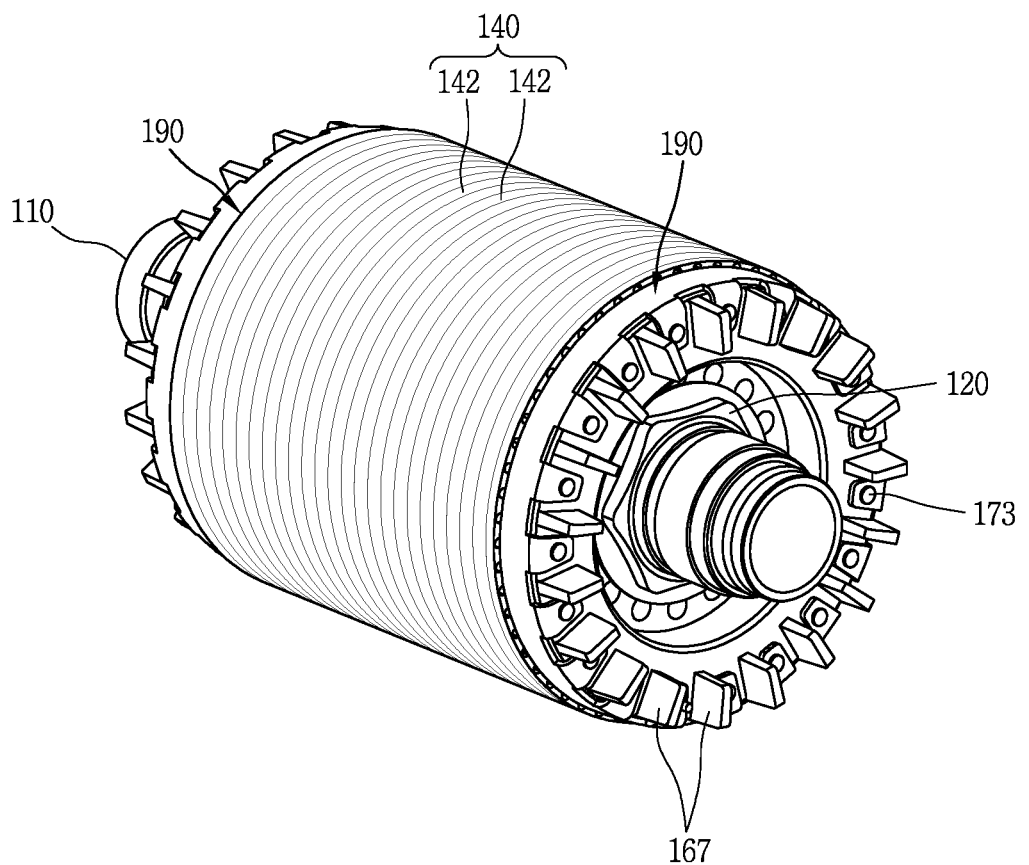
FIG. 1 is a perspective view showing an example rotor for an example electric motor.
Figure 2:
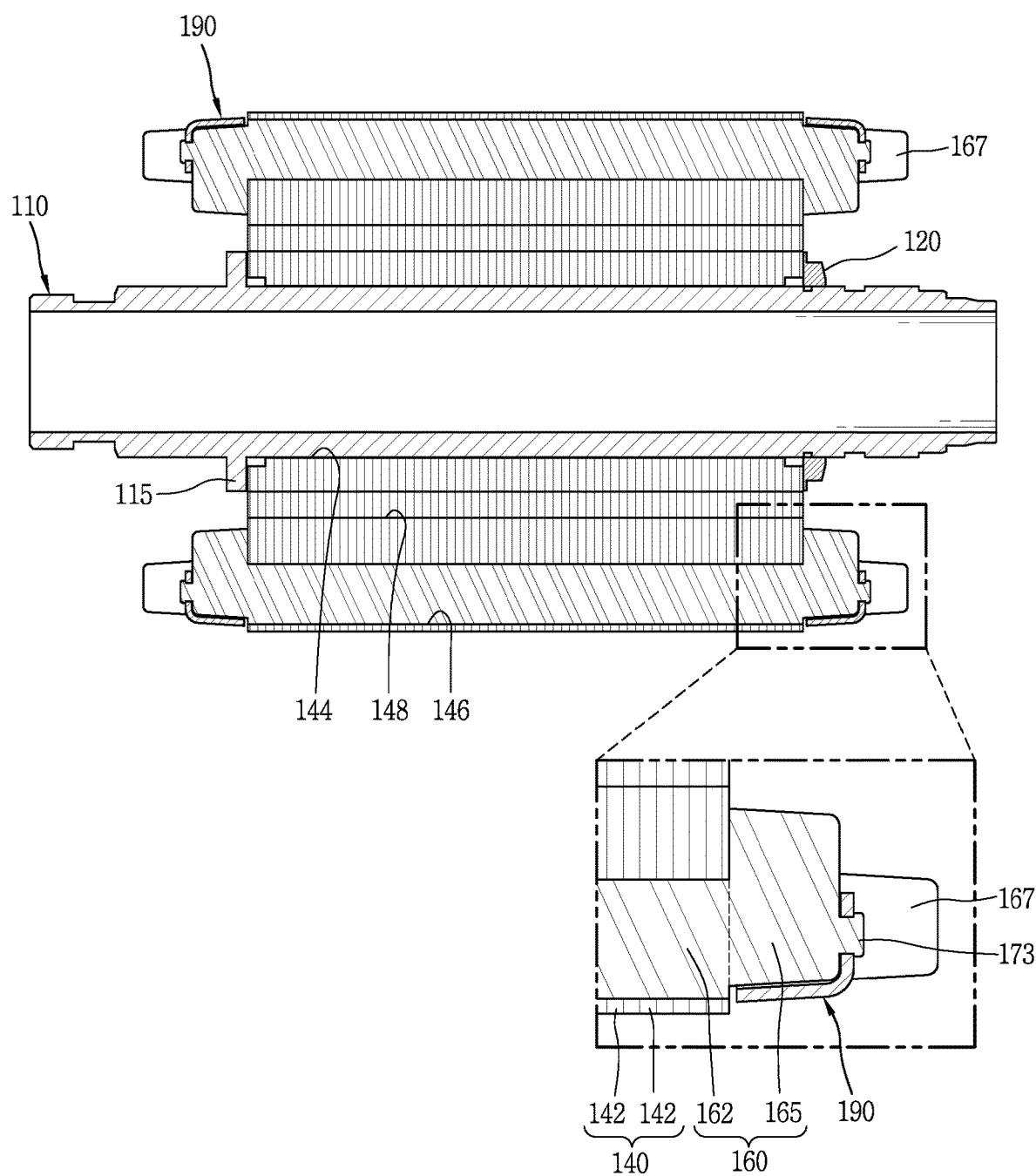
FIG. 2 is a sectional view showing the rotor of FIG. 1.
Figure 3:
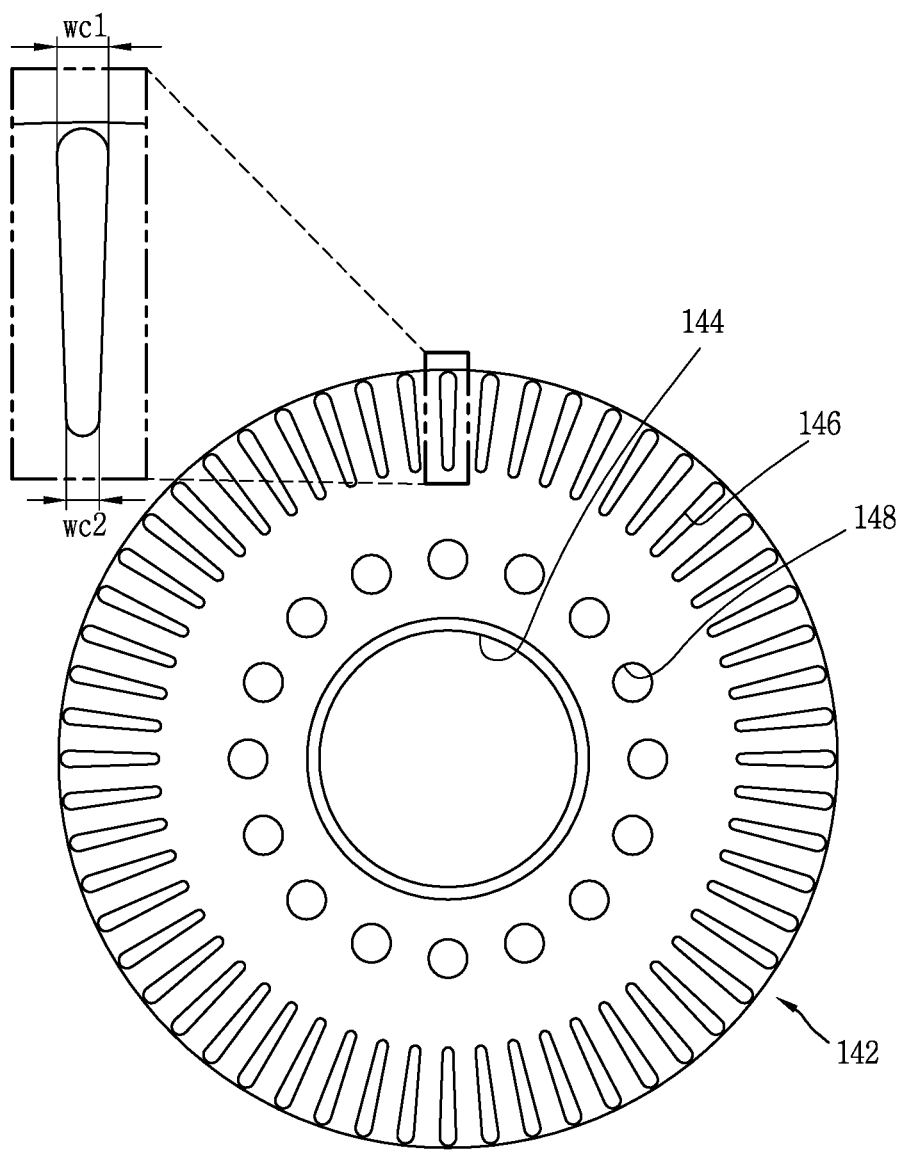
FIG. 3 is a front view showing an example electric steel plate of FIG. 2.

FIG. 1 illustrates an example rotor for an electric motor, FIG. 2 is a sectional view of the example rotor of FIG. 1, and FIG. 3 is a front view showing an example electric steel plate of the rotor core of FIG. 1.

As illustrated in FIGS. 1 and 2, the example rotor for an electric motor may include a rotor core 140 provided with a plurality of slots 146 that are spaced apart from each other in a circumferential direction of the rotor core 140, a rotor winding 160 including a plurality of conductor bars 162 located inside the plurality of slots 146, and end rings 165 disposed on both ends of the conductor bars 162 such that current may flow through the conductor bars 162 and the end rings, and deformation preventing units 190 made of a material having a thermal expansion coefficient less than that of the end ring 165, each having a ring shape to closely contact or adhere to an outer surface of the corresponding end ring 165, and restricting the end rings from being deformed outward along a radial direction.

The rotor may include a rotating shaft 110 coupled to a center of the rotor core 140, for example. A rotating shaft hole 144 may be defined through a center of the rotor core 140 such that the rotating shaft 110 can be inserted therethrough.

In some examples, the rotor core 140 may include a penetrating portion 148 penetrated therethrough along an axial direction. The penetrating portion 148 may allow both end regions of the rotor core 140 to communicate with each other. A fluid (e.g., air) in both end regions of the rotor core 140 may flow to opposite regions through the penetration portion 148. For example, the penetrating portion 148 may be disposed around the rotating shaft hole 144. In some examples, the penetrating portion 148 may be provided in plurality, disposed on a circumference of the rotating shaft hole 144 with being spaced apart from one another along the circumferential direction.

In some examples, the rotor core 140 may include a plurality of slots 146 defined therethrough in the axial direction. For example, each of the plurality of slots 146 may have an elliptical cross section having a long length in the radial direction of the rotor core 140. Each of the plurality of slots 146, as illustrated in FIG. 3, may have a cross section that a width wc1 of an end portion adjacent to a circumferential side is larger than a width wc2 of an end portion adjacent to the rotating shaft hole 144. The rotor core 140 may include, for example, stacking a plurality of electric steel plates 142 in an insulating manner.

For example, each of the plurality of electric steel plates 142, as illustrated in FIG. 3, may define a rotating shaft hole 144 at its center and arrange the plurality of slots 146 around the rotating shaft hole 144. Each of the electric steel plates 142 may further include penetrating portions 148 that penetrate therethrough in an axial direction and are disposed between the rotating shaft hole 144 and the plurality of slots 146.

In some implementations, the rotor core 140 may include the rotor winding 160. The rotor winding 160, for example, may include a plurality of conductor bars 162 disposed in the plurality of slots 146 of the rotor core 140, and end rings 165 disposed on both ends of the rotor core 140 to connect both end portions of the plurality of conductor bars 162 such that currents can flow.

Figure 4:
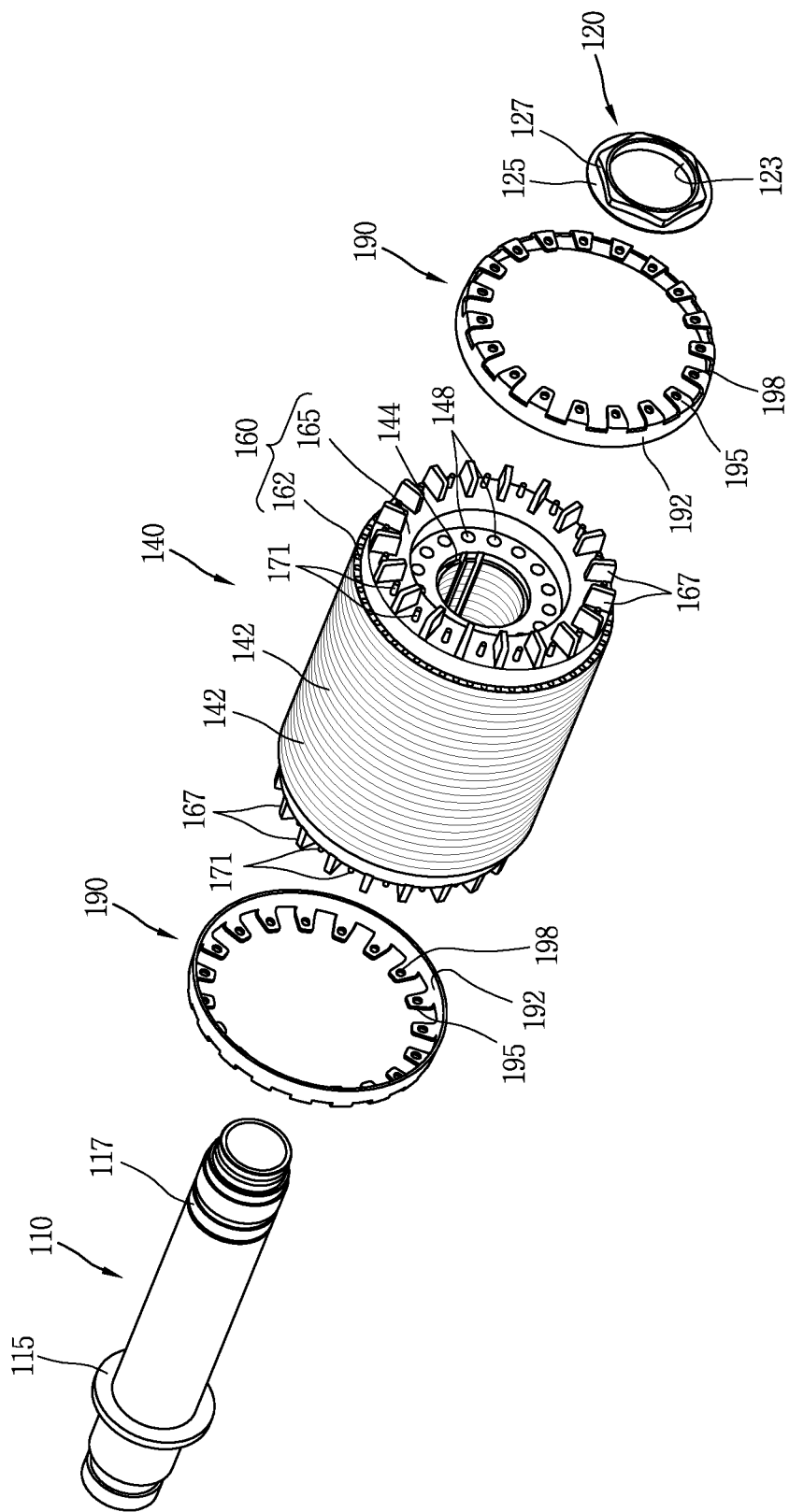
FIG. 4 is an exploded perspective view showing the rotor of FIG. 2.
Figure 5:
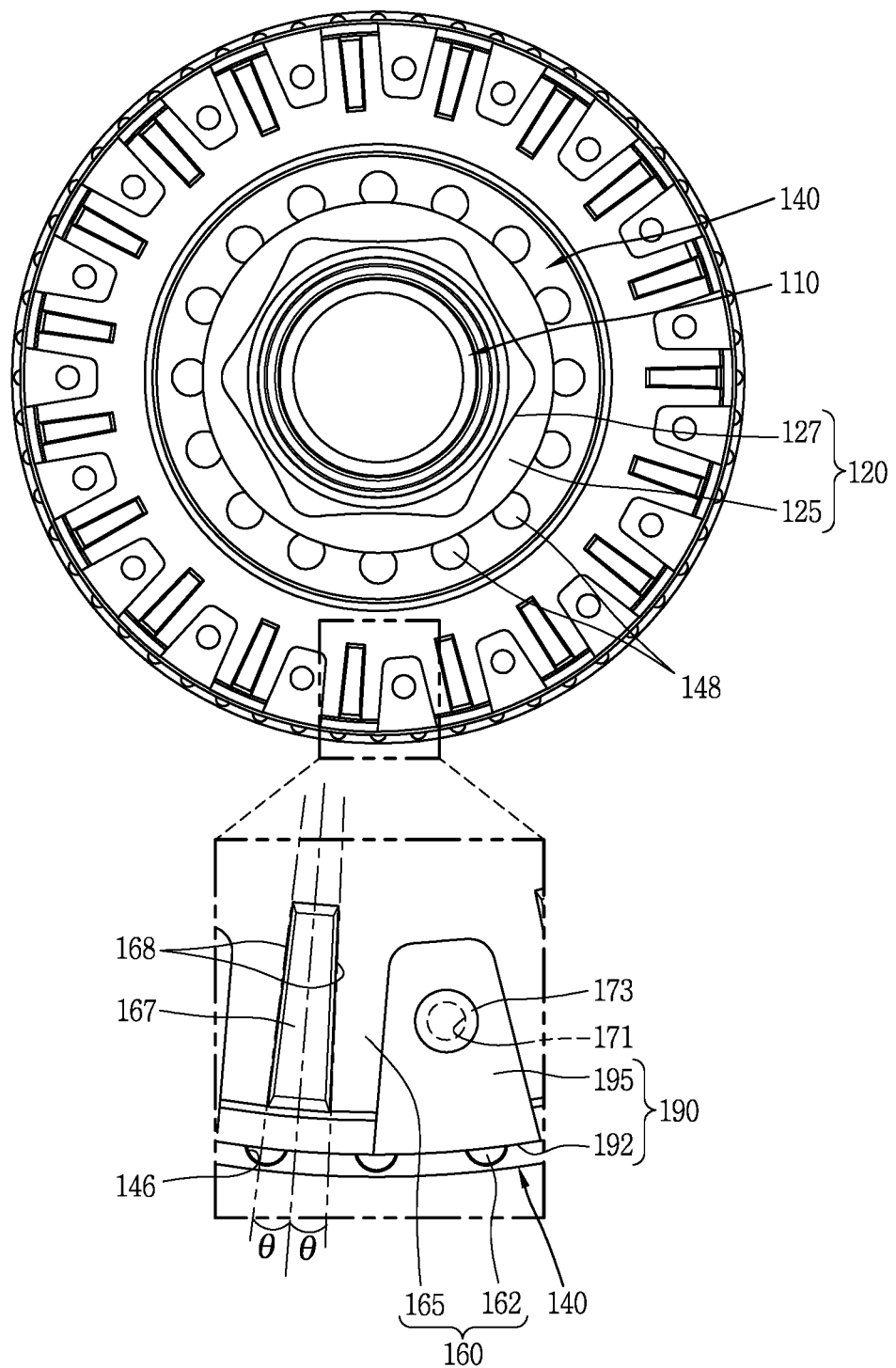
FIG. 5 is a right side view showing the rotor of FIG. 1.

FIG. 4 is an exploded perspective view showing the rotor of FIG. 2, and FIG. 5 is a right side view showing the rotor of FIG. 1.

As illustrated in FIG. 4, the rotating shaft 110 may be inserted into the rotating shaft hole 144 of the rotor core 140. A stopper 115 for limiting a movement of the rotor core 140 may be provided on one end portion of the rotating shaft 110. For example, the stopper 115 may protrude radially outward from an outer surface of the rotating shaft 110. In some cases, the stopper 115 may protrude from the outer surface of the rotating shaft 110 in the radial direction and extend along the circumferential direction.

In some examples, a lock nut 120 for limiting the movement of the rotor core 140 may be coupled to another side of the rotating shaft 110. The rotating shaft 110 may include a male screw portion 117 so that the lock nut 120 can be screwed thereto. The lock nut 120 may include a female screw portion 123 so as to be screwed to the male screw portion 117. In some examples, the lock nut 120 may have a flange portion 125 that extends outwardly in the radial direction. The lock nut 120 may include a tool coupling portion 127 so that a tool can be coupled to its outer surface.

In some implementations, the tool coupling portion 127 may have an outer surface in a hexagonal shape. Alternatively, the tool coupling portion 127 may have an outer surface with two flat surfaces parallel to each other, or in a rectangular or octagonal shape.

The end rings 165 may protrude from both ends of the rotor core 140, respectively, in the axial direction. Each of the end rings 165 may have a ring shape. In some examples, the plurality of conductor bars 162 and the end rings 165 may be made of aluminum. For example, the plurality of conductor bars 162 and the end rings 165 may be aluminum members manufactured in a die-casting manner. The plurality of conductor bars 162 made of the aluminum member may have a reduced weight.

In some implementations, the plurality of slots 146, which the plurality of conductor bars 162 are inserted into, can be positioned closer to an outer surface of the rotor core 140. The outer surface of the rotor core 140 defines an outer diameter of the rotor core 140.

In examples where the plurality of conductor bars 162 are disposed closer to the stator, electromotive force, which is induced in the plurality of conductor bars 162 by an electromagnetic induction phenomenon, may increase and output density (e.g., power per unit volume) can be improved.

In some examples, each of the end rings 165 may have a diameter (e.g., outer diameter) that is less than a diameter of a virtual line (e.g., virtual circle) connecting outer ends of the plurality of conductor bars 162. In other words, the outer surface of the end rings 165 is disposed radially inward of an outer surface of the plurality of conductor bars 162. The outer surface of the plurality of conductor bars 162 may be disposed radially outward of an outer surface of the deformation preventing units.

In this example, even if the end rings 165 expand or are deformed in the radial direction due an increase of temperature of the rotor, interference or contact with the stator caused by the expansion of the end rings 165 may be prevented.

In some implementations, each end ring 165 may include a protruding portion 167 protruding from an end portion or an end surface of the end ring 165 in the axial direction. The end surface of each end ring 165 may be a surface that is perpendicular to a center axis of the rotor core 140 and that faces outwards.

In some examples, the protruding portion 167 may be provided in plurality spaced apart in the circumferential direction of the end ring 165. As a result, a surface area of each end ring 165 may be increased, and an increase in temperature of the end ring 165 can be reduced by dissipating heat through the surface area of each end ring 165 including the protruding portion 167.

In some examples, each of the protruding portions 167 may include side surfaces 168 that are inclined in the radial direction of the rotor core 140, respectively. Each of the side surfaces 168 of the protruding portion 167, as illustrated in FIG. 5, may define a preset inclination angle θ with a radial virtual line that connects a center of the rotor core 140 and a center of each protruding portion 167. In some examples, flow of the fluid (e.g., air) may be facilitated by the inclined side surfaces 168 of each protruding portion 167 when the rotor or the rotor core 140 is rotated.

For example, since the side surfaces 168 of each of the protruding portions 167 are inclined toward the center of the rotor core 140, an outer end portion of each protruding portion 167 may serve as a leading edge disposed at the front with respect to the rotating direction, and compress or cause the fluid (e.g., air) to flow inwardly toward the center during the rotation. Accordingly, the fluid or air may flow from outside to inside of the end ring 165, which may dissipate heat from the rotor or rotor core 140.

Although this example describes that the side surfaces 168 of each protruding portion 167 are inclined toward the center, in some examples, the side surfaces 168 of each protruding portion 167 may be inclined outwardly such that the fluid such as air can flow to outside along the radial direction.

Also, this example illustrates that the both side surfaces 168 of each protruding portion 167 are inclined, respectively. In some implementations, only one side surface 168 disposed at a front of the protruding portion 167 may be inclined in consideration of the rotating direction of the rotor. For example, the front of the protruding portion 167 is a surface that faces toward the rotation direction.

A deformation preventing unit 190 may be coupled to an outer surface or an outer circumferential surface of each end ring 165. The deformation preventing unit 190 may be made of a material having a thermal expansion coefficient less than that of the end ring 165, and have a ring shape to contact or closely adhere to the outer surface of the end ring 165, so as to prevent the end ring 165 from being deformed outwardly in the radial direction.

In some examples, the end ring 165 may include a protrusion 171 protruding in the axial direction. In some examples, the protrusion 171 may be provided in plurality protruding from an end surface of each end ring 165, and the plurality of protrusions 171 may be spaced apart from each other in the circumferential direction.

In some examples, the protrusions 171 may be disposed between the neighboring protruding portions 167. The deformation preventing unit 190 may include a body portion 192 in a ring shape, and protrusion coupling portions 195 extending from the body portion 192 along the radial direction and coupled to the protrusions 171. In some examples, the deformation preventing unit 190 may be implemented as a stainless steel member.

In this example, when a temperature of the rotor or the end ring 165 increases, the deformation preventing unit 190 may restrict the end ring 165 from expanding outwardly in the radial direction of the rotor core 140 because the thermal expansion coefficient of the deformation preventing unit 190 is less than a thermal expansion coefficient of the end ring 165.

Figure 6:
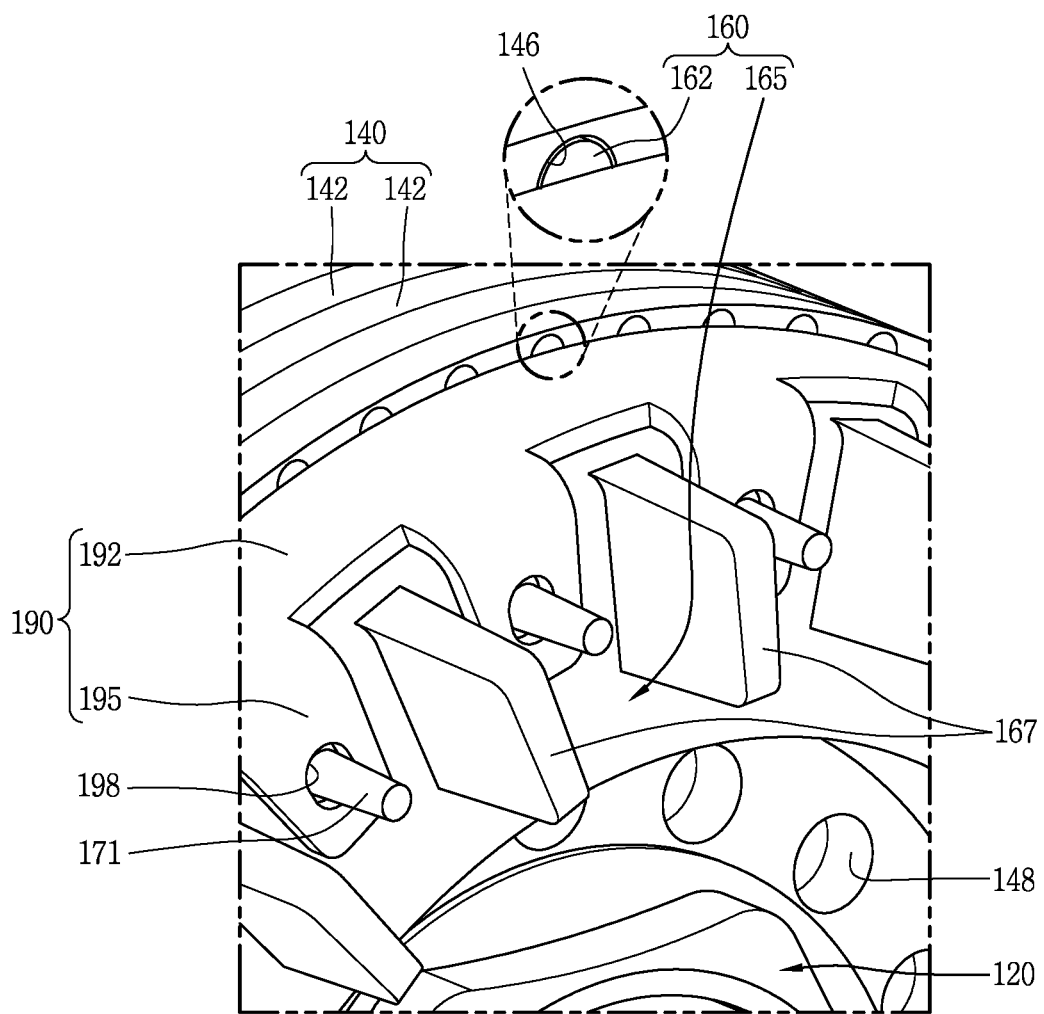
FIG. 6 is an enlarged view showing an example parts in a coupled state between example protrusions and example protrusion coupling portions of FIG. 4.
Figure 7:
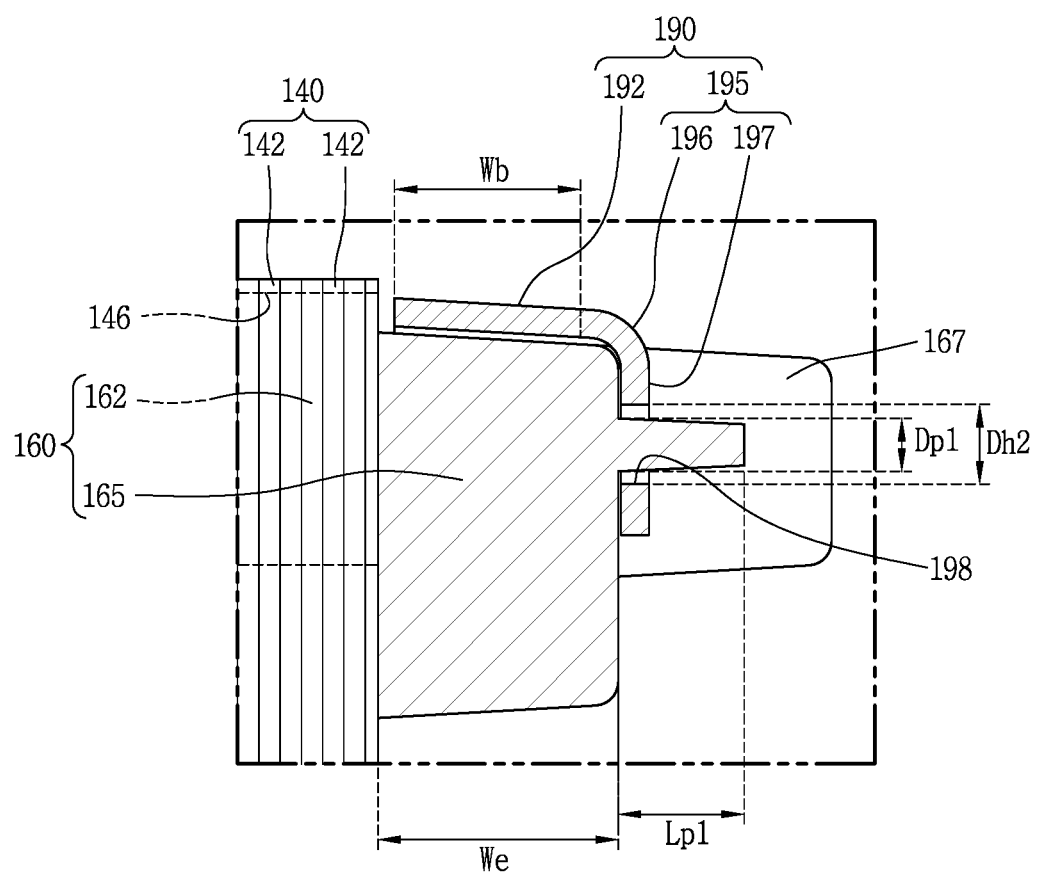
FIG. 7 is a sectional view of FIG. 6.

FIG. 6 is an enlarged view showing a portion of the rotor in a coupled state between the protrusions and the protrusion coupling portions of FIG. 4, and FIG. 7 is a sectional view of FIG. 6.

In some example, the body portion 192, as illustrated in FIGS. 6 and 7, may have a width Wb in the axial direction thereof that is smaller than a width We of the end ring 165 in the axial direction of the end ring 165. In some examples, the body portion 192 may have a smaller outer diameter than the rotor core 140. Each of the protrusion coupling portions 195 may include an axial section 196 extending from the body portion 192 in the axial direction, and a radial section 197 bent in the radial direction from the axial section 196. In some examples, the protrusion coupling portions 195 may be spaced apart from one another at predetermined intervals.

In some examples, stress concentration on the end ring 165 due to a temperature increase of the rotor may be reduced by virtue of a region of the end ring 165 which is not brought into contact with the deformation preventing unit 190, thereby preventing damage, such as cracks, on the end ring 165.

Each of the protrusion coupling portions 195 may define, for example, a through hole 198 through which the protrusion 171 can be inserted. For example, the through hole 198 may have a circular shape. The protrusion 171 may have a first diameter Dp1 and a first length Lp1 before pressed. The through hole 198 may have a second diameter Dh2 that is larger than the first diameter Dp1 so that the protrusion 171 may insert into the through hole 198.

Figure 8:
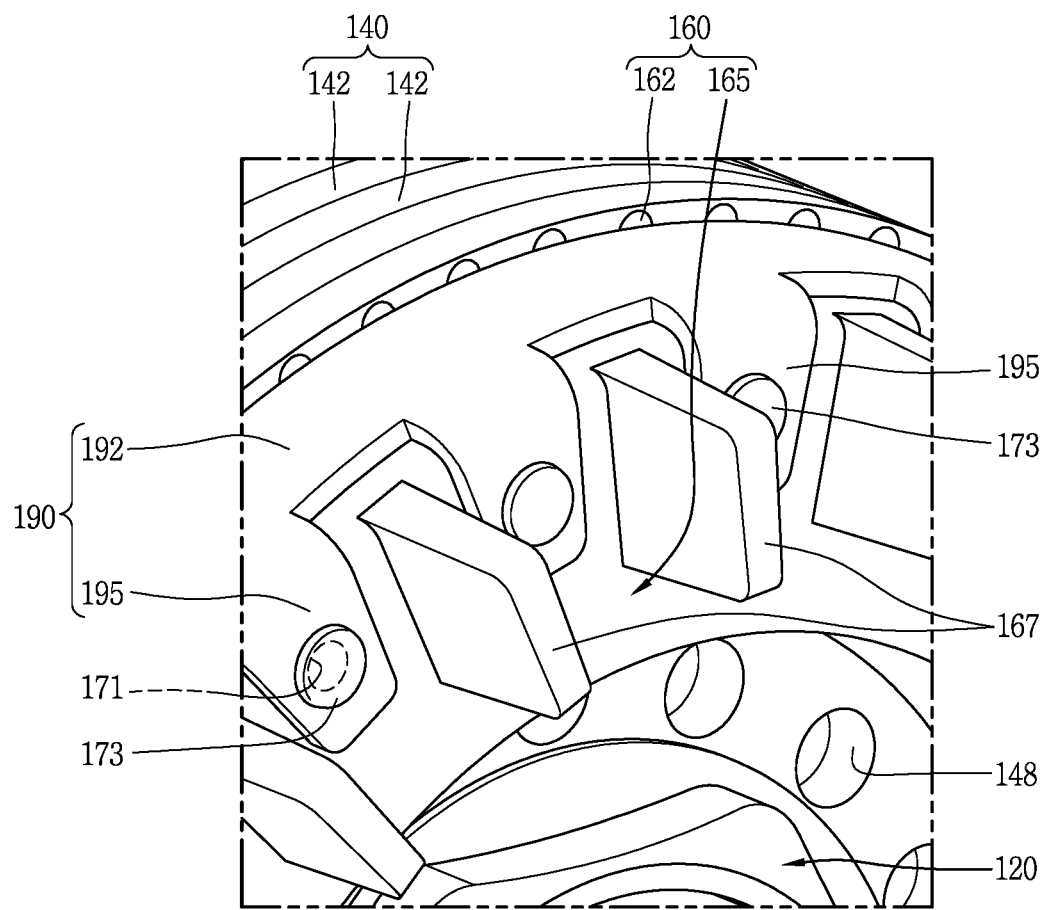
FIG. 8 is a view showing an example head portion of the protrusion of FIG. 1.
Figure 9:
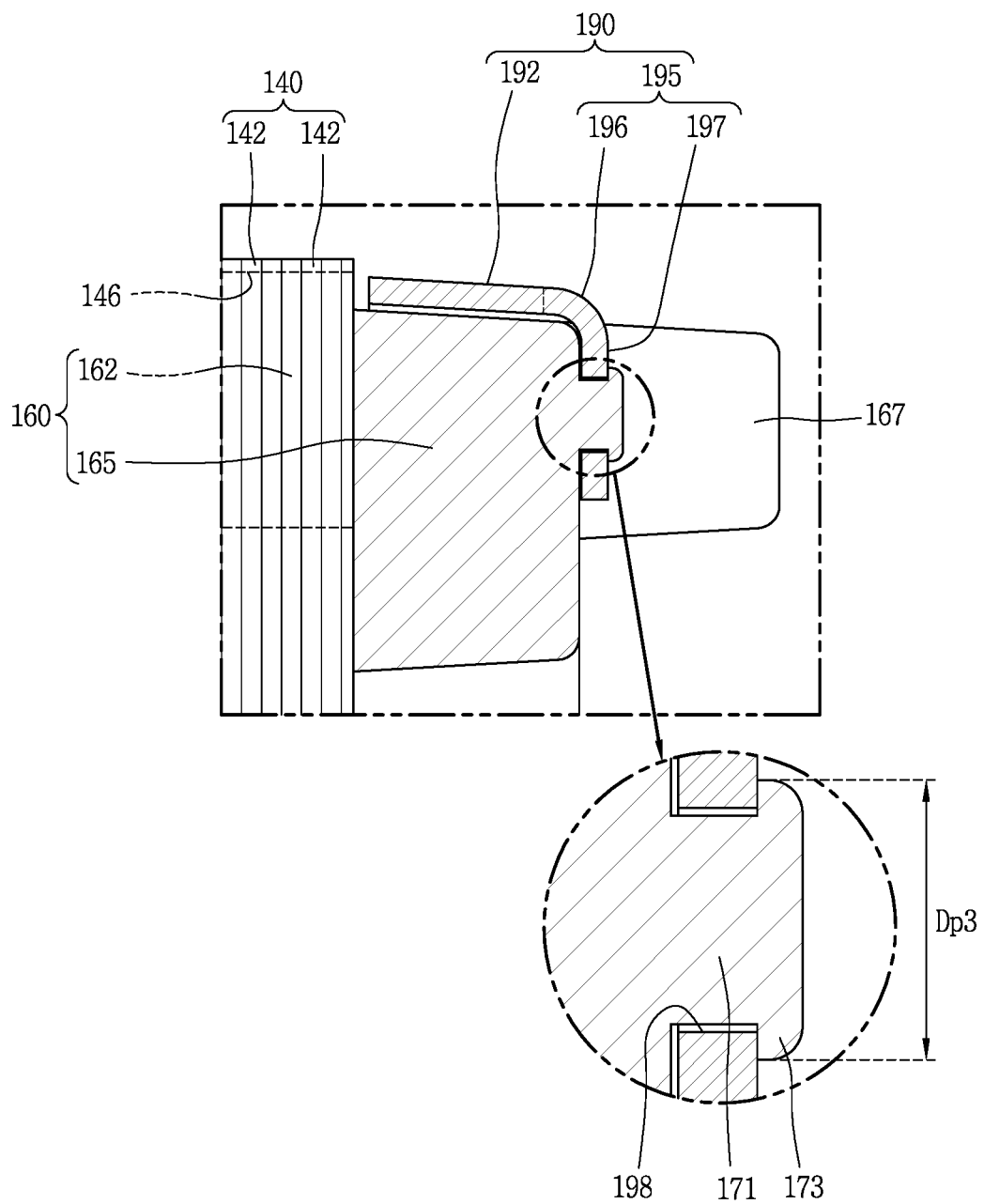
FIG. 9 is a sectional view showing the protrusion of FIG. 8.

FIG. 8 is a view illustrating an example head portion of the protrusion of FIG. 1, and FIG. 9 is a sectional view of the protrusion of FIG. 8.

In some examples, as illustrated in FIG. 8, after the deformation preventing unit 190 is coupled to the end ring 165, an end portion of each protrusion 171, which is externally exposed through the through hole 198 of the protrusion coupling portion 195, may be pressed in the axial direction and a head portion 173 may be defined by the pressing process. The protrusion 171 which has been pressed, as illustrated in FIG. 9, may be shortened in a lengthwise direction thereof (e.g., axial direction of the rotor core) and expands in a radial direction of the through hole 198 so as to have a second diameter Dh2.

In some cases, the head portion 173 of the protrusion 171 may have a third diameter Dp3 that is larger than the second diameter Dh2 which is the diameter of the through hole 198.

Accordingly, the deformation preventing unit 190 may be restricted from being separated from the end ring 165 in the axial direction based on the head portion 173 having been pressed in the axial direction to expand to the third diameter Dp3.

In some examples, the plurality of conductor bars 162 may be positioned within the plurality of slots 146 of the rotor core 140. The rotor core 140 may include a plurality of electric steel plates 142 laminated in the axial direction, and the end rings 165 may be integrally provided on both ends of the rotor core 140. The deformation preventing units 190 may be coupled to the end rings 165, respectively, along the axial direction.

After coupling the deformation preventing units 190 to the end rings 165, the protrusions 171 of the respective end rings 165 may be pressed in the axial direction to define the head portions 173.

The rotor for the electric motor may be disposed with a preset air gap from the stator so as to be rotatable about a center of the rotating shaft 110.

When an operation is started and power is applied to the stator, a magnetic field is generated by the stator coil, and induction current is generated in the rotor winding 160 by electromagnetic induction.

The rotor may be rotated with a predetermined slip about a center of the rotating shaft 110 by interaction between a magnetic field generated by the induction current and the magnetic field generated by the stator coil. The rotor may be rotated at a preset speed, and the temperatures of the stator and the rotor may be raised by heat generation. The surface area of each end ring 165 may be increased by the plurality of protruding portions 167 and the protrusions 171, which may facilitate heat dissipation and reduce a temperature increase.

In some examples, movement of the fluid (e.g., air) around the protruding portions 167 may be facilitated by the side surfaces 168 each that have a predetermined inclination angle with respect to the radial direction of the rotor, so that an increase of the temperature of the rotor and the stator can be further suppressed.

The deformation preventing units 190 may support the end rings 165 against a high temperature and centrifugal force of the end rings 165, so that the end rings 165 can be prevented from being deformed and/or damaged in the radial direction.

In the rotor for the electric motor of this implementation, since the end rings 165 is supported by the deformation preventing units 190 to prevent from being deformed and damaged due to a high temperature and centrifugal force thereof, air gaps between the end rings and the stator can be further reduced.

As a result, gaps between the plurality of conductor bars 162 and the stator may further be reduced and a magnitude of electromotive force induced in the rotor winding 160 may increase, which may improve output density of the electric motor.

Hereinafter, another implementation of the present disclosure will be described with reference to FIGS. 10 to 14.

Figure 10:
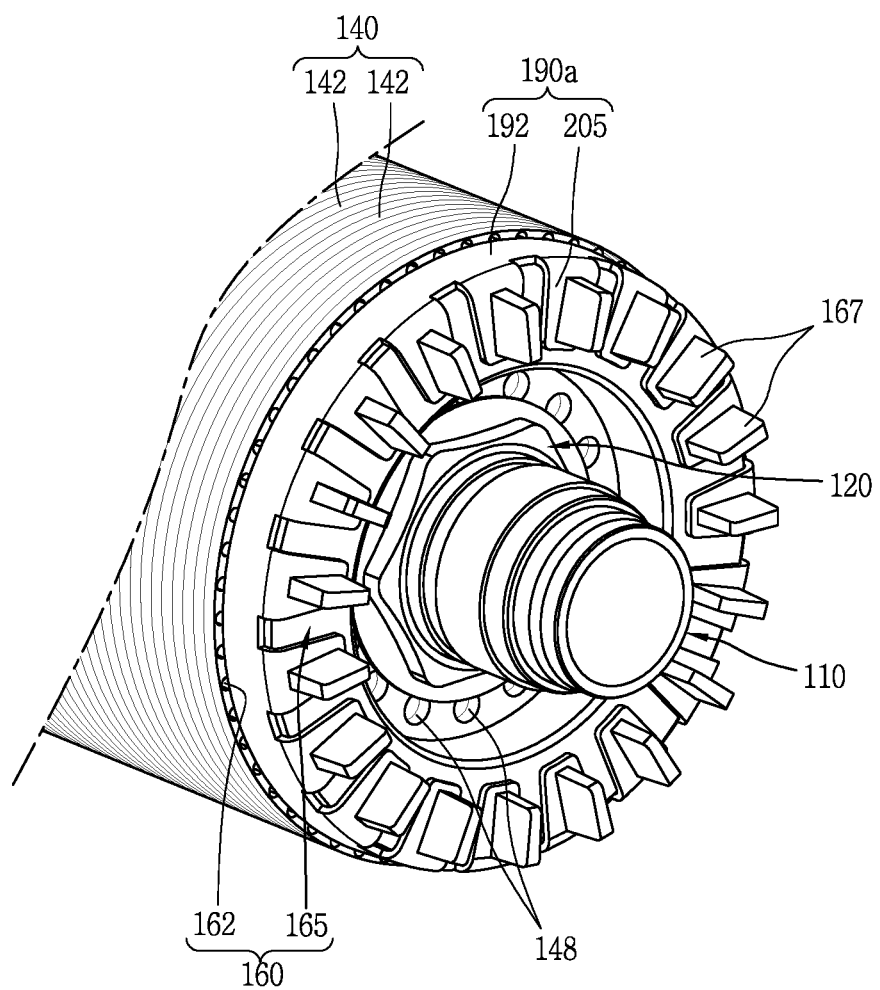
FIG. 10 is a perspective view showing another example rotor for an electric motor.

FIG. 10 is a perspective view showing another example rotor for an electric motor.

A rotor for an electric motor according to this implementation, as illustrated in the foregoing description and FIG. 10, may include a rotor core 140 provided with a plurality of slots 146 spaced apart from one another in a circumferential direction, a rotor winding 160 provided with a plurality of conductor bars 162 disposed inside the plurality of slots 146, and end rings 165 disposed on both ends of the conductor bar 162 such that currents can flow, and deformation preventing units 190a made of a material having a thermal expansion coefficient smaller than that of the end ring 165, each having a ring shape to be closely adhered on an outer surface of the corresponding end ring 165, and preventing the end rings from being deformed outward along a radial direction.

In some examples, the rotor winding 160 may be made of an aluminum member. The rotor winding 160 may be integrated or made integrally with the rotor core 140 in a die-casting manner. The end rings 165 may be provided at both ends of the rotor core 140, respectively. Each of the end rings 165 may have a protruding portion 167 protruding in an axial direction of the rotor core 140. The protruding portion 167 may be provided in a plurality, spaced apart from one another along a circumferential direction of the end ring 165.

In some examples, each of the protruding portions 167 may have a rectangular cross section with a long length in a radial direction. The protruding portions 167 may be spaced apart from one another along the circumferential direction.

Figure 11:
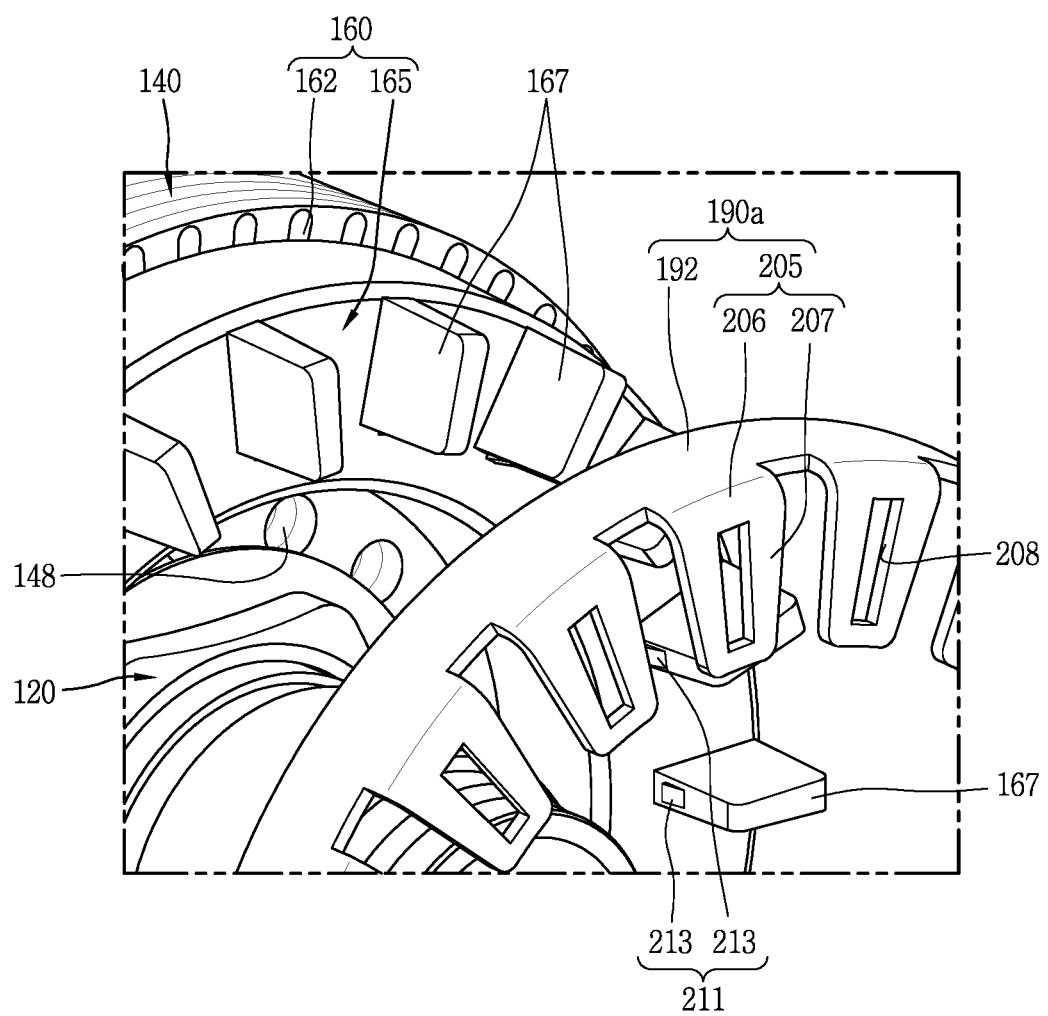
FIG. 11 is a perspective view showing example parts before coupling an example deformation preventing unit of FIG. 10.
Figure 12:
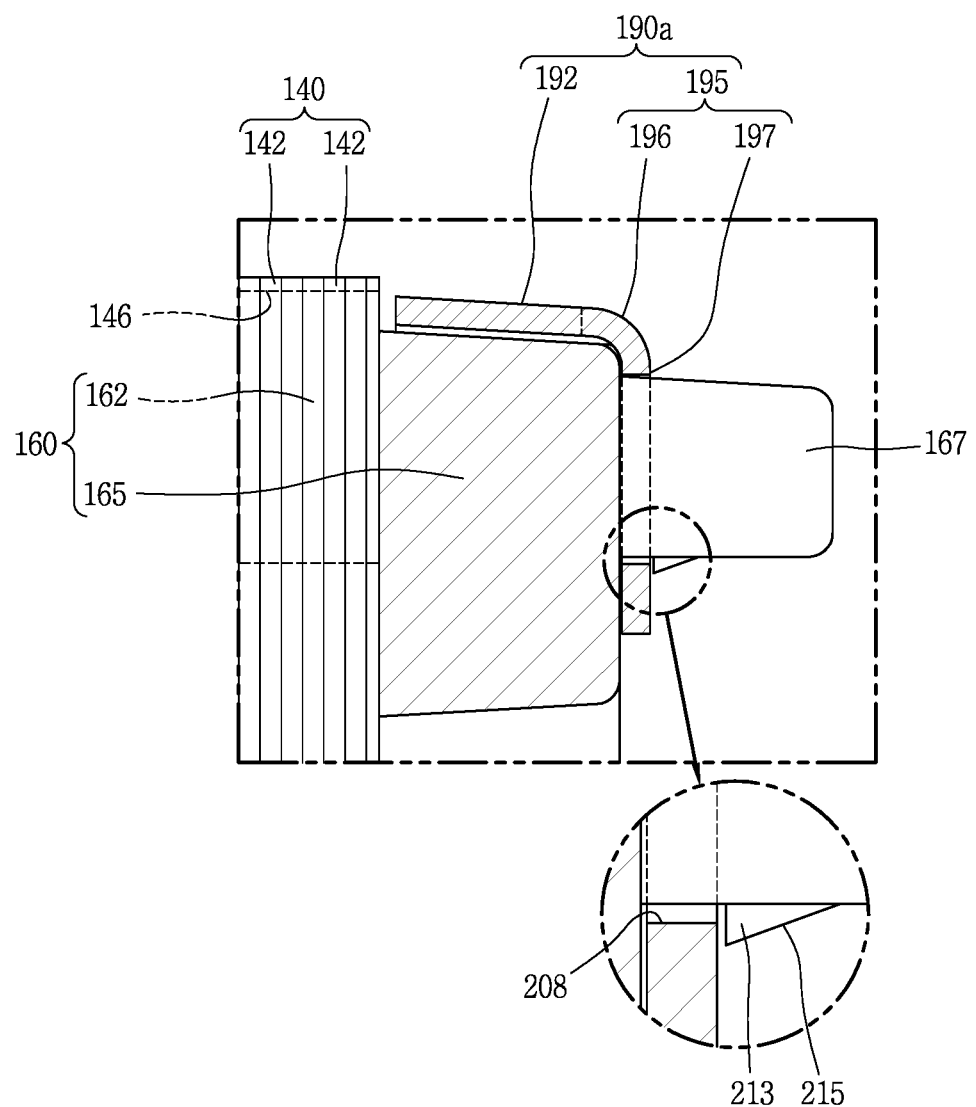
FIG. 12 is a sectional view showing an example coupled state of FIG. 11.
Figure 13:
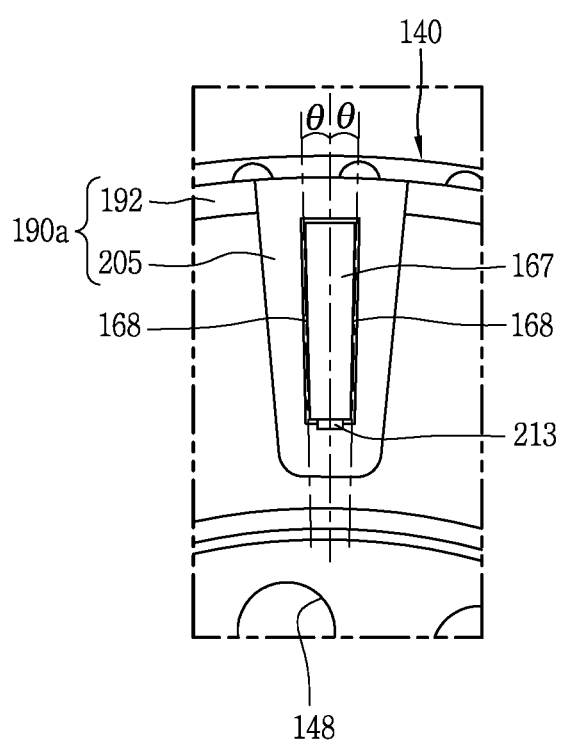
FIG. 13 is an enlarged view showing an example protruding portion of FIG. 12.
Figure 14:
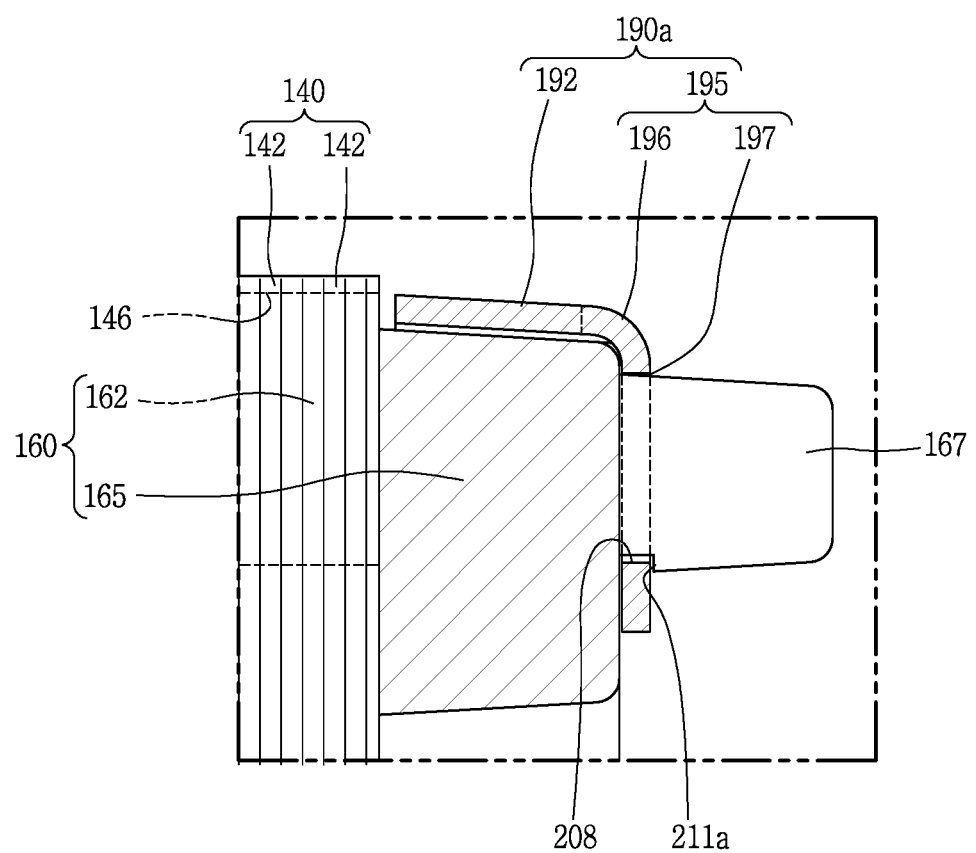
FIG. 14 is a view showing a variation of an example separation preventing unit of FIG. 12.

FIG. 11 is a perspective view showing a portion of the rotor before coupling the deformation preventing units 190 of FIG. 10, FIG. 12 is a sectional view showing a coupled state between the protruding portions and coupling portions of FIG. 11, FIG. 13 is an enlarged view showing the protruding portion of FIG. 12, and FIG. 14 is an example variation of a separation preventing unit of FIG. 12.

For example, the deformation preventing unit 190a, as illustrated in FIG. 11, may include a ring-shaped body portion 192, and coupling portions 205 extending in the radial direction from the body portion 192 and coupled to the protruding portions 167. The deformation preventing unit 190a may be made of, for example, a stainless steel member. In some examples, the body portion 192, as illustrated in FIG. 12, may have a reduced width in the axial direction as compared to a width of the end ring 165 in the axial direction of the end ring 165.

Each of the coupling portions 205 may include an axial section 206 disposed along the axial direction of the rotor core 140, and a radial section 207 bent from the axial section 206 and disposed along the radial direction of the rotor core 140. The coupling portion 205 may define a through hole 208 through which the protruding portion 167 can be inserted. For example, the through hole 208 may have a rectangular shape to correspond to the cross section of the protruding portion 167.

In some implementations, the protruding portion 167 and the coupling portion 205 may include a separation preventing unit 211 to prevent the separation of the coupling portion 205. The separation preventing unit 211 may include, for example, a separation preventing protrusion 213 protruding horizontally (laterally) in the axial direction. The separation preventing protrusion 213 may protrude from an outer surface of the coupling portion 205. The separation preventing protrusion 213 may be disposed at an inner end portion of each protruding portion 167, for example.

In some examples, the separation preventing protrusion 213 may have a reduced width as compared to a width or thickness of each of the protruding portions 167 in the circumferential direction. The separation preventing protrusion 213 may be spaced from an end surface of the end ring 165 at a position corresponding to the thickness of the coupling portion 205.

In some examples, as illustrated in FIG. 12, the separation preventing protrusion 213 may include a guide slope 215 that is inclined to guide the coupling portion 205.

As illustrated in FIG. 13, the protruding portion 167, for example, may have a predetermined inclination angle with respect to a radial virtual line connecting a center of the rotor core 140 and a center of the protruding portion 167. In this example, both side surfaces 168 of the protruding portion 167 are inclined inward. In other examples, only one side surface that is disposed at a front of a rotating direction of the rotor may be inclined.

In some implementations, as illustrated in FIG. 14, a separation preventing unit 211a may also be configured in a manner that one side of the protruding portion 167 is cut to define a recess and a side wall or side portion of a through hole 208 is brought into contact with an inside of the recess so as to prevent the separation.

In this example, the separation preventing unit is defined by cutting the inner end portion of the protruding portion 167 to increase the inner diameter, so as to prevent an unintentional separation of the coupling portion 205. In other examples, the side surface 168 of the protruding portion 167 may be cut into a groove shape.

The foregoing description has been given with respect to the example implementations of the disclosure. However, the present disclosure may be implemented in various ways without departing from the spirit or essential characteristics thereof. Therefore, the above-described implementations should not be limited by the details of the detailed description.

It should also be understood that the above-described implementations are not limited by any of the details of the foregoing description, unless otherwise specified, but rather should be construed broadly within its scope as defined in the appended claims, therefore all changes and modifications that fall within the metes and bounds of the claims, or equivalents of such metes and bounds are therefore intended to be embraced by the appended claims.

What is claimed is:

1. A rotor for an electric motor, the rotor comprising:
a rotor core defining a plurality of slots that are spaced apart from each other and arranged along a circumferential direction of the rotor core;
a rotor winding provided at the plurality of slots and configured to flow current, the rotor winding comprising:
a plurality of conductor bars that are made of aluminum, each conductor bar extending in an axial direction of the rotor core and being disposed in a slot of the plurality of slots, and
end rings that are made of aluminum, that are disposed at both sides of the plurality of conductor bars, and that connect the plurality of conductor bars to each other, each of the end rings including a protrusion that protrudes from an end surface spaced apart from one of the sides of the plurality of conductor bars in the axial direction of the rotor core; and
deformation preventing units that are configured to restrict deformation of the end rings, each deformation preventing unit surrounding and contacting an outer surface of one of the end rings,
wherein the outer surface of the end rings is disposed radially inward of an outer surface of the plurality of conductor bars, and
wherein each of the deformation preventing units comprises:
a body portion having a ring shape and surrounding the outer surface of one of the end rings, and
a protrusion coupling portion extending from the body portion in a radial direction of the rotor core and coupling to the protrusion.

2. The rotor of claim 1, wherein a thermal expansion coefficient of the deformation preventing units is less than that of the end rings to restrict radial deformation of the end rings.

3. The rotor of claim 1, wherein the protrusion coupling portion defines a through hole that receives the protrusion, and
wherein the protrusion includes a head portion having a diameter greater than the through hole and configured to restrict axial movement of the deformation preventing units.

4. The rotor of claim 3, wherein the head portion is configured to extend outside the through hole by pressing the head portion in the axial direction based on the protrusion having been inserted in the through hole.

5. The rotor of claim 1, wherein the protrusion includes a plurality of protrusions that are spaced apart from each other and arranged along the circumferential direction on the end surface of one of the end rings, and
wherein the end rings further include a protruding portion that protrudes from the end surface in the axial direction and is disposed on at least one side of each of the plurality of protrusions.

6. The rotor of claim 5, wherein the protruding portion includes a plurality of protrusion portions, each protrusion portion being disposed between a pair of protrusions.

7. The rotor of claim 1, wherein an outer diameter of the rotor core is greater than an outer diameter of each of the end rings.

8. A rotor for a motor, the rotor comprising:
a rotor core defining a plurality of slots that are spaced apart from each other and arranged along a circumferential direction of the rotor core;
a rotor winding provided at the plurality of slots and configured to flow current, the rotor winding comprising:
a plurality of conductor bars that are made of aluminum, each conductor bar extending in an axial direction of the rotor core and being disposed in a slot of the plurality of slots, and
end rings that are made of aluminum, that are disposed at both sides of the plurality of conductor bars, and that connect the plurality of conductor bars to each other, each of the end rings including a protrusion that protrudes from an end surface spaced apart from one of the sides of the plurality of conductor bars in the axial direction of the rotor core; and
deformation preventing units configured to restrict deformation of the end rings, each deformation preventing unit surrounding and contacting an outer surface of one of the end rings,
wherein the outer surface of the end rings is disposed radially inward of an outer surface of the plurality of conductor bars,
wherein each of the end rings further includes a protruding portion that protrudes from the end surface in the axial direction of the rotor core, and
wherein each of the deformation preventing units comprises:
a body portion having a ring shape and surrounding the outer surface of one of the end rings, and
a coupling portion extending from the body portion in a radial direction of the rotor core and coupling to the protruding portion.

9. The rotor of claim 8, wherein the protruding portion includes a separation preventing unit that protrudes from a surface of the protruding portion and that is configured to restrict separation of the protruding portion from the coupling portion based on the protruding portion being coupled to the coupling portion.

10. The rotor of claim 9, wherein the protruding portion couples to the coupling portion in the axial direction, and
wherein the separation preventing unit includes a separation preventing protrusion that extends in the axial direction.

11. The rotor of claim 8, wherein the protruding portion defines a side surface that slopes with respect to the radial direction of the rotor core by a predetermined inclination angle.

12. The rotor of claim 8, wherein the protruding portion includes a plurality of protruding portions that are spaced apart from each other and arranged along the circumferential direction on the end surface of one of the end rings, and
wherein the coupling portion includes a plurality of coupling portions that couple to the plurality of protruding portions, respectively.

13. The rotor of claim 8,
wherein an outer diameter of the deformation preventing units is less than or equal to an outer diameter of the rotor core.

14. The rotor of claim 8, wherein a width of the end rings in the axial direction is greater than a width of the deformation preventing units in the axial direction.

15. The rotor of claim 8, wherein the rotor core defines a plurality of penetrating portions that extend through the rotor core in the axial direction and that allow flow of air or liquid through the penetrating portions,
  wherein the plurality of penetrating portions are disposed radially inward of the outer surface of the deformation preventing units.

16. The rotor of claim 8, wherein the slot includes an outer surface and an inner surface disposed radially inward of the outer surface of the slot, and
  wherein a width of the outer surface of the slot is greater than that of the inner surface of the slot.

17. The rotor of claim 8,
  wherein the protrusion comprises a plurality of protrusions that protrude from the end surface in the axial direction and that are arranged in the circumferential direction of the rotor core, and
  wherein the protruding portion comprises a plurality of protruding portions that protrude from the end surface and that are alternately disposed between the plurality of protrusions.

* * * * *